UNITED STATES PATENT OFFICE.

GEORGE W. SCOLLAY, OF NEW YORK, N. Y.

REFINING VEGETABLE OILS.

SPECIFICATION forming part of Letters Patent No. 498,821, dated June 6, 1893.

Application filed September 8, 1892. Serial No. 445,382. (No specimens.)

*To all whom it may concern:*

Be it known that I, GEORGE W. SCOLLAY, a citizen of the United States, residing in the city, county, and State of New York, have invented certain new and useful Improvements in the Method of Refining Vegetable Oils, of which the following is a specification.

My present invention relates to the refining of vegetable oils and it consists of certain novel methods pointed out in the concluding claims.

For the purpose of enabling others skilled in the art to understand my invention and to practice it in the manner at present preferred by me, I will describe how it may be applied in the purification of linseed oil; but it will be understood that my invention may be employed in the purification of other analogous oils and that various modifications may be adopted without departing from the spirit and without exceeding the scope of the claims.

It is a well-known fact that continued boiling of crude linseed oil, or linseed oil from which the mucilage, &c., has been removed, causes it to grow darker and darker. I have, however, discovered that the first effect of raising linseed oil to the boiling point is to discharge the yellow color and to separate whatever mucilage, &c., are present; that if the temperature be reduced below the effective point when this result is accomplished a white oil is obtained from which the precipitated mucilage (if any there be) may be separated in the well-known ways; but if the temperature be continued longer at the effective point the oil grows darker and darker. The experience which I have thus far obtained seems to teach that the briefest exposure of the oil to the effective temperature (which is about boiling point) accompanied by the most rapid rise of temperature to, and fall of temperature from this point produces the whitest oil, so that I am led to believe that the desired changes are effected almost, if not quite, instantaneously when the proper temperature is reached, and that the deteriorating effects begin immediately thereafter if the temperature be continued. Whether these deductions from the facts observed be true or not, certain it is that a brief exposure of the oil to about the boiling temperature causes more or less of the color to be discharged, while further exposure to such heat will make the oil darker; and if the mucilage, &c., have not been removed these will, at the same time, be separated.

The principal feature of my present invention, as I now understand it, therefore, consists of heating the oil to the effective temperature, thereby discharging more or less of the natural color of the oil and separating the mucilage, if it contains any, and then reducing it below the effective temperature before the natural color of the oil has been all recovered. In this way an oil of improved color will be obtained, whether that so treated be crude oil, or oil from which the mucilage, &c., have been eliminated. Any suitable means of accomplishing this result may be employed, the invention being of methods of treatment independent of the apparatus or appliances used.

As I have before observed I have obtained the best results by a rapid rise and fall of temperature to and from the boiling point. As to avoid boiling over heat must be cautiously applied to crude linseed oil in an open vessel. I prefer to confine the oil during treatment, subject to a pressure high enough to overcome this difficulty. Heat may then be applied as rapidly as desired.

As an illustration of how my invention may be practiced in refining linseed oil, I will now describe the manner in which I at present prefer to work it, although it will be understood that my invention may be worked in other ways.

A tank containing oil to be refined is located at a suitable elevation and from this tank a small pipe—having, say, a caliber of one inch—leads downward and passes through a sand-bath or other device for maintaining an even or regulated temperature. The oil leaving the tank in a continuously flowing stream is, while under pressure, heated in passing through the sand-bath to a temperature, say, from 615° to 690° Fahrenheit. Leaving the sand-bath the high heat is rapidly given up to the surrounding atmosphere or to other cooling media and the oil is led to the settling tanks where it is preferably kept at about 150° Fahrenheit until the mucilage, &c., have settled, when the refined oil is drawn off.

If the oil is discharged into the settling tank before its temperature has fallen below 212° Fahrenheit the steam generated by the elimination of water from the mucilage will not have been condensed before it has had an opportunity to escape. By regulating the bore of the pipe, the length of pipe exposed to heat and the rate of flow of the oil through the pipe, the time during which the oil is exposed to the heat of the sand-bath and the rapidity of its rise and fall can all be regulated as experience may direct.

By the term "effective temperature" I mean the temperature at which the changes described take place.

What I claim is—

1. The method of refining linseed and analogous oils, consisting in heating the oil to the point where the natural color of the oil is discharged and then at once reducing the temperature that is before the natural color of the oil has been recovered.

2. The method of refining crude linseed and analogous oils, consisting in heating the oil to the point where the natural color of the oil is discharged and the mucilaginous and other impurities separated and then at once reducing the temperature that is before the natural color of the oil has been recovered.

3. The method of refining linseed and analogous oils, consisting in heating the oil while under pressure to the point where the natural color of the oil is discharged and then at once reducing the temperature that is before the natural color of the oil has been recovered.

GEO. W. SCOLLAY.

Witnesses:
  M. WILSON,
  J. EDGAR BULL.